W. F. BEASLEY.
VEHICLE TIRE.
APPLICATION FILED JUNE 21, 1911.
1,051,798.
Patented Jan. 28, 1913.
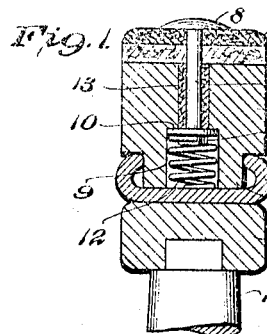
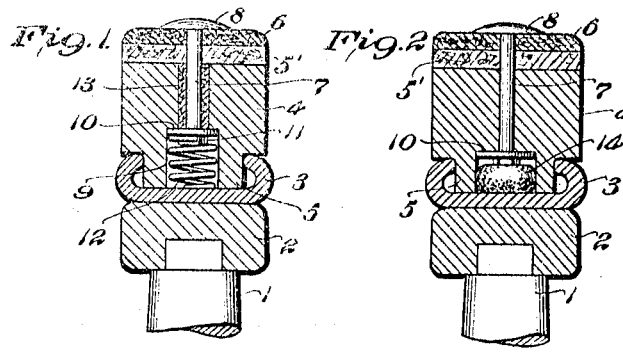
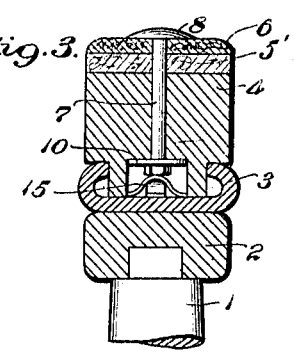
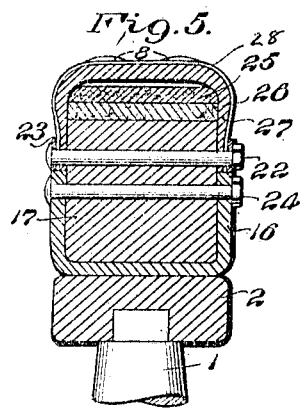
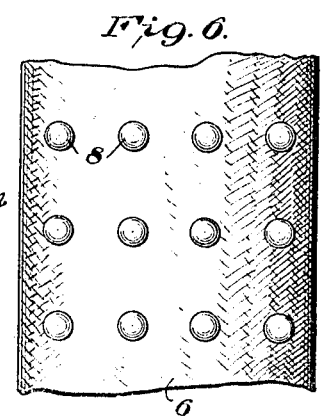
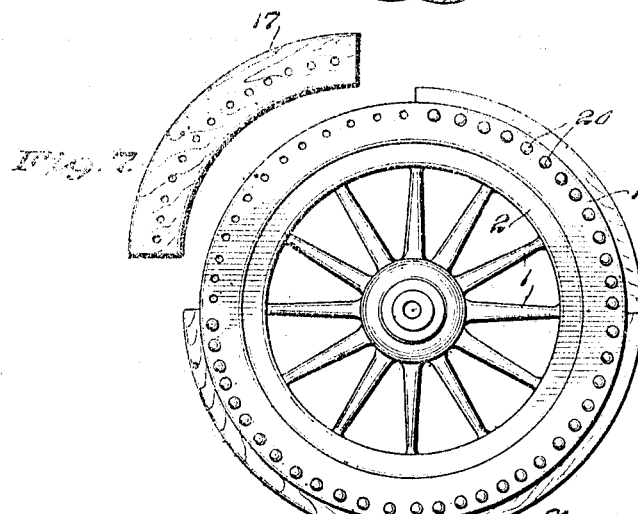
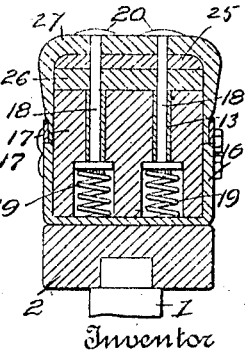

UNITED STATES PATENT OFFICE.

WILLIAM F. BEASLEY, OF PLYMOUTH, NORTH CAROLINA.

VEHICLE-TIRE.

1,051,798.   Specification of Letters Patent.   Patented Jan. 28, 1913.

Application filed June 21, 1911. Serial No. 634,583.

*To all whom it may concern:*

Be it known that I, WILLIAM F. BEASLEY, a citizen of the United States, and resident of Plymouth, in the county of Washington and State of North Carolina, have invented certain new and useful Improvements in Vehicle-Tires, of which the following is a specification.

It has been my object to produce as a substitute for a pneumatic tire a simple and efficient tire construction which will have all of the resiliency which is now required of pneumatic tires and which will be much more durable and much cheaper to use.

A further object is to make a tire which can be easily and quickly applied to any ordinary wheel and which can be easily and quickly repaired if a part is broken or injured.

The novel features of the invention will be apparent from the following description taken in connection with the drawings.

In the drawings: Figure 1 is a cross section through the rim of a wheel having one form of my invention applied thereto; Fig. 2 is a similar view showing a slightly modified construction; Fig. 3 is a similar view showing another modification; Fig. 4 is a cross section of a modified construction having a plurality of plungers transversely of the tire and a casing over the tread; Fig. 5 is a similar view taken on the line between the row of plungers; Fig. 6 is a plan view of a portion of the tread of the tire embodying another modification of my invention; Fig. 7 is a side view of a wheel showing how all forms of my tire base may be applied thereto in sections.

Considering now the specific construction shown in Fig. 1, 1 represents the spokes of an ordinary wheel such as is used on automobiles or similar vehicles and 2 represents the wooden rim on which is mounted the ordinary clencher rim 3 which has heretofore been used to receive the pneumatic tire. In the clencher rim I provide a base 4 which is preferably made of wood and which has a contracted lower portion 5 which fits within the clencher rim. The base 4 is made circular in form so as to fit around the rim of the wheel and is preferably made in sections longitudinally so that it can be easily applied to the rim, and those sections are secured in place or secured together in any suitable way. On the base 4 I mount resilient material 5' which will stand compression and which will form with the upper layer 6 the tread of the tire. I prefer to use as the material 5' a rubber composition made from particles of old rubber cemented together as set forth in a companion application filed by me No. 634,360 June 20, 1911, but it will be understood that the tread portion of the tire resting on the base 4 may be made of any suitable resilient material. Radial members or plungers 7 of rigid material pass through the base 4 and through the tread portion of the tire having flattened bearing heads 8 resting on the tread. These radial members are preferably in the form of bolts as shown, and at their inner ends they enter cylindrical sockets 9 bored in the lower side of the base 4, and a washer 10 is placed on the bolt at this point and is held in position by a nut 11 so as to limit the outward movement of the bolt. It will be observed that by this construction the tread is fastened in place by means of the bolt and that the resilient tread supports the bolt by means of the head 8. Within the socket 9 I place resilient supporting means for the bolt resting on the rim 3, in this particular instance the resilient support being shown in the form of a coiled spring 12. In this construction it will be understood that the weight of the vehicle is supported by the bolts 7, which bolts are in turn resiliently supported both by the tread portions 5', 6, and the spring 12. Since the bolts slide in the bearing in the base 4 the friction may cause heat, and if desired, the bolt may be surrounded by a collar 13 of asbestos or other heat resisting means.

It will be understood that the number of bolts or supporting members 7 will depend upon the character of the vehicle on which the tire is used and that a sufficient number will be employed to give the proper support to the vehicle. In some forms it will be necessary to use a number of bolts in line transversely of the rim as shown in Fig. 6. Since the bolts carry the weight of the vehicle there will be little wear on the resilient tread, the principal wear being that due to the pressure of the head 8, but this is relieved by the spring 12.

In Fig. 2 the construction is similar to that described in connection with Fig. 1 except that the support for the inner ends of the radial members or bolts 7 are in this instance in the form of rubber balls 14. The construction shown in Fig. 3 is the same except that the support is in this instance in the form of a resilient member 15 bell-shaped in cross section.

In Figs. 4 and 5 I have shown an arrangement in which I make use of two bolts in line across the tire, passing through resilient tread sections 25, 26, and I cover these sections with the casing 27 of canvas, raw hide or suitable material, the bolts passing through the casing as well as the tread. In the form shown in these figures the wheel rim 2 is provided with a metal rim 16 in place of the clencher rim above described, this rim 16 being U-shaped in cross section and the rigid base sections 17 fitting within the U-rim against its base and close against the side flanges. The sections 17 are preferably made of wood segmental in shape placed end to end around the circumference, so as to make up a complete circle. The bolts 24 pass transversely through the sections and through the side flanges so as to removably hold the sections in place. The radial plungers 18 pass through openings in the sections 17 and are supported at their lower end by the springs 19, which springs are guided and supported by the side walls of the openings in the sections 17. The plungers pass through the layers of elastic material 25, 26, on the base of the sections 17 and also through the casing 27, the heads 20 of the plungers resting on the casing.

It will be observed that in all forms of the invention each one of the bolts is separately supported by the springs or other resilient means at their inner ends so that the weight of the vehicle is successively taken up by the various bolts which are placed in sufficient number around the circumference of the tire to form practically a continuous series of supports, and the action is therefore very much like that of a pneumatic tire. In other words the entire wheel rim does not give in going over a stone or obstruction, but only that portion of the tire which strikes it. The bolts are limited in their outward movement by the washers 10 and they are supported not only by the springs within the rigid base but also by the resilient tread. When the sections of my tire are used with the clencher rim the ends of the sections may be clamped or secured together by any suitable means and it will thus be seen that my tire is adapted for use as an emergency tire on any ordinary automobile and is also adapted for use as the permanent tire on the same machine.

Straps 28 may be passed around the tread section as shown in Fig. 5 for the purpose of strengthening it and holding the parts in place, particularly against side strains.

It will of course be understood that the springs 12 or other resilient means supporting the bolts may be made as strong as desired to serve on the wheel where used and that the width of the tire and the number of bolts may be varied in accordance with the weight of the vehicle.

It will be understood that the sections 17 shown in Fig. 7 may be made in accordance with any one of the specific forms illustrated in the other figures, the base member being made in sections shown as constituting a quarter of the circumference so that they may be easily and quickly put in place and if one section is injured a new section may be substituted without taking down the entire wheel. In this particular form it will be observed that the sections are held in place in the U rim by means of the bolts 24 passing through them.

Having thus described my invention what I claim as new and desire to secure by Letters-Patent is:

1. A tire comprising a rigid circular base, a tread of elastic material, plungers having heads fitting against said elastic material and passing through said material and into said base, and resilient supports in said base for said plungers.

2. A tire comprising a rigid base, a tread of elastic material, rigid plungers at intervals passing through said material into said base, and resilient supports in said base for said plungers.

3. A tire comprising a rigid base adapted to fit on a wheel, a tread of elastic material on said base, a series of separate plungers of rigid material passing through said tread into said base and partially supported by said material, and separate resilient supports within said base for the inner ends of said plungers.

4. A tire comprising a rigid base adapted to fit on a wheel having radial openings therein, a tread of elastic material on said base, a series of separate members of rigid material passing through said tread into said base fitting in said radial openings and partially supported by said material, and separate resilient supports within said base for the inner ends of said members, and a casing extending over and inclosing said tread section and secured to said base along the sides.

5. In a device of the class described, the combination with a metal rim U-shaped in cross section, of a series of rigid segmental sections closely fitting within said rim around the circumference against the base thereof and provided with radial openings, bolts passing transversely through said sections and the flanges of said rim to removably hold said sections in place, plungers slidably mounted in said radial openings and projecting from said sections, springs within said radial openings resting on said rim and supporting said plungers, the said springs being laterally supported and guided by the side walls of said openings, and a tread of elastic material on said sections surrounding the projecting ends of said plungers.

In testimony whereof I affix my signature in presence of two witnesses.

WILLIAM F. BEASLEY.

Witnesses:
ARTHUR L. BRYANT,
JOHN M. COIT.